(12) United States Patent
Li et al.

(10) Patent No.: US 9,307,466 B2
(45) Date of Patent: Apr. 5, 2016

(54) IN-CALL HANDOFF BETWEEN CELLULAR AND PACKET SWITCHED NETWORKS

(75) Inventors: X.M. Li, Jiangsu (CN); D.F. Jiang, Jiangsu (CN); Echo Wang, Jiangsu (CN)

(73) Assignee: Google Technology Holdings LLC, Mountain View, CA (US)

( * ) Notice: Subject to any disclaimer, the term of this patent is extended or adjusted under 35 U.S.C. 154(b) by 1696 days.

(21) Appl. No.: 11/930,355

(22) Filed: Oct. 31, 2007

(65) Prior Publication Data

US 2009/0111471 A1    Apr. 30, 2009

(51) Int. Cl.
*H04W 36/00* (2009.01)
*H04W 36/14* (2009.01)
*H04W 8/26* (2009.01)
*H04W 36/36* (2009.01)

(52) U.S. Cl.
CPC ............... *H04W 36/14* (2013.01); *H04W 8/26* (2013.01); *H04W 36/36* (2013.01)

(58) Field of Classification Search
USPC ........... 455/436–444, 524–525, 426.1–426.2, 455/554.1–555; 370/338, 331–332
See application file for complete search history.

(56) References Cited

U.S. PATENT DOCUMENTS

| | | | |
|---|---|---|---|
| 7,162,236 B2 | 1/2007 | Dorenbosch et al. | |
| 2004/0266426 A1* | 12/2004 | Marsh et al. | 455/426.2 |
| 2006/0058032 A1 | 3/2006 | Pearce et al. | |
| 2006/0121902 A1* | 6/2006 | Jagadeesan et al. | 455/439 |
| 2006/0268781 A1* | 11/2006 | Svensson et al. | 370/331 |
| 2006/0270447 A1* | 11/2006 | Everson et al. | 455/552.1 |
| 2007/0111752 A1 | 5/2007 | Pazhyannur | |

OTHER PUBLICATIONS

GSM "3rd Generation Partnership Project;Technical Specification Group Services and System Aspects;Voice Call Continuity between CS and IMS Study (Release 7)" 2005 Valbonne V France.

* cited by examiner

*Primary Examiner* — Shahriar Behnamian
(74) *Attorney, Agent, or Firm* — Lerner, David, Littenberg, Krumholz & Mentlik, LLP

(57) ABSTRACT

A telecommunications device is operable to perform in-call handoff between a cellular network and a packet-switched network. The telecommunications device includes interfaces connecting the telecommunications device with a circuit-switched network and a packet-switched network. The telecommunications device is operable to receive a request from a multi-mode device to handoff an existing call over a cellular network to the packet-switched network. The existing call is between the multi-mode device and a remote party and was established without the telecommunications device. In response to receiving the request, the telecommunications device establishes a first call leg in the packet-switched network with the multi-mode device. The multi-mode device sends a transfer signal to a call server in the cellular network requesting the transfer of the on-going voice session from itself to the telecommunication device. A second call leg is setup between the telecommunication device and a remote party. The telecommunication device helps to bridge the first call and second call leg, and then the multi-mode device can continue the voice session in packet switched network.

20 Claims, 6 Drawing Sheets

IN-CALL HANDOFF BETWEEN CELLULAR AND PACKET SWITCHED NETWORKS

BACKGROUND

With the increasing popularity of communication devices, service providers have introduced a variety of services. To make these services available to users, service providers use a variety of network technologies. The particular network technology used generally depends upon the type of service being offered, and its technical requirement, e.g., the bandwidth required. Service providers have also implemented the capability of providing similar services over different network technologies, including cellular networks, as well as packet switched networks, such as wireless local area networks (WLANs). A user might wish to use one or the other type of network technology. As an example, voice calls made over a WLAN may be chargeable at a lower tariff rate than those made over cellular networks. Due to such differences, the user might wish to use a WLAN when available to make voice over Internet Protocol (VoIP) calls. Existing systems with a call server in a WLAN allow a call originating in the WLAN to be terminated in either a cellular network or the WLAN. However, a call originating in a cellular network typically cannot be terminated in a WLAN unless two-stage calling is used to anchor the call on the WLAN call server first. This is because a call originating in the cellular network normally communicates with a cellular network call server only, and does not go through the WLAN call server. Thus, it is difficult to seamlessly handoff a call originated in a cellular network to a WLAN.

One solution comprises the two-stage calling. For two-stage calling, when a user in a cellular network makes a call, the call is anchored at the WLAN call server when the call is originated. That is, the call is made through the call server and includes at least one leg in the cellular network between the caller and the WLAN call server. Then, the call is routed to the callee via the WLAN call server, for example, in the cellular network or in a public switched network (PSTN). The WLAN call server thus facilitates handoff to the WLAN when the user is in range of the WLAN. Two-stage calling, however, is not needed for most calls because most calls originated in the cellular network are completed or terminated before a user enters the WLAN. For example, many cellular calls may be short and have a duration only when the user is out of range from the WLAN. Also, resources at the WLAN call server may be limited, and routing all calls through the WLAN call server may overwhelm the WLAN call server and result in dropped calls or being unable to make calls when needed.

SUMMARY

According to an embodiment, a telecommunications device is operable to perform in-call handoff between a cellular network and a packet-switched network. The telecommunications device includes a circuit-switched interface connecting the telecommunications device with a circuit-switched network, and a packet-switched network interface connecting the telecommunications device with a packet-switched network. The telecommunications device also includes a processor receiving a request from a multi-mode device to handoff an existing call over a cellular network to the packet-switched network, wherein the existing call is between the multi-mode device and a remote party and was established without the telecommunications device in the cellular network.

In response to receiving the request, telecommunications device establishes a first call leg in the packet-switched network with the multi-mode device and establishes a second call leg with the remote party via the circuit-switched interface. The telecommunications device transfers the call from the cellular network to the telecommunications device such that the call between the multi-mode device and the remote party uses the first and second call legs.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. Numerous specific details are set forth in order to provide a thorough understanding of the embodiments. It will be apparent however, to one of ordinary skill in the art, that the embodiments may be practiced without limitation to many of these specific details. Also, in some instances, well known methods and structures are not described in detail so as not to unnecessarily obscure the description of the embodiments.

According to an embodiment, a system is operable to perform in-call handoff. A multi-mode device is operable to communicate with other devices using at least two different types of interfaces. In one embodiment, the multi-mode device includes a cellular interface and a wireless local area network interface (WLAN). The multi-mode device may receive and make cellular calls via the cellular interface when the device has cellular coverage, and may receive and make VoIP calls over the WLAN interface when the device falls within the coverage of the WLAN.

According to an embodiment, the system includes a call manager that is operable to communicate with the multi-mode device to perform in-call handoff from a cellular network to a packet switched network. The call manager is operable to handoff an existing cellular call to a VoIP call in a WLAN without using two-stage calling. The cellular call is not anchored with the call manager when it is originated. Instead, the call may later be anchored on the call manager to perform handoff when the multi-mode device is in the coverage of the WLAN.

Thus, two-stage calling is not performed for every cellular call, and every call originated in the cellular network need not be anchored on the call manager in order to transfer the call to a VoIP call. Thus, resources at the call manager are not strained, which may result in less dropped calls.

Figure 1:
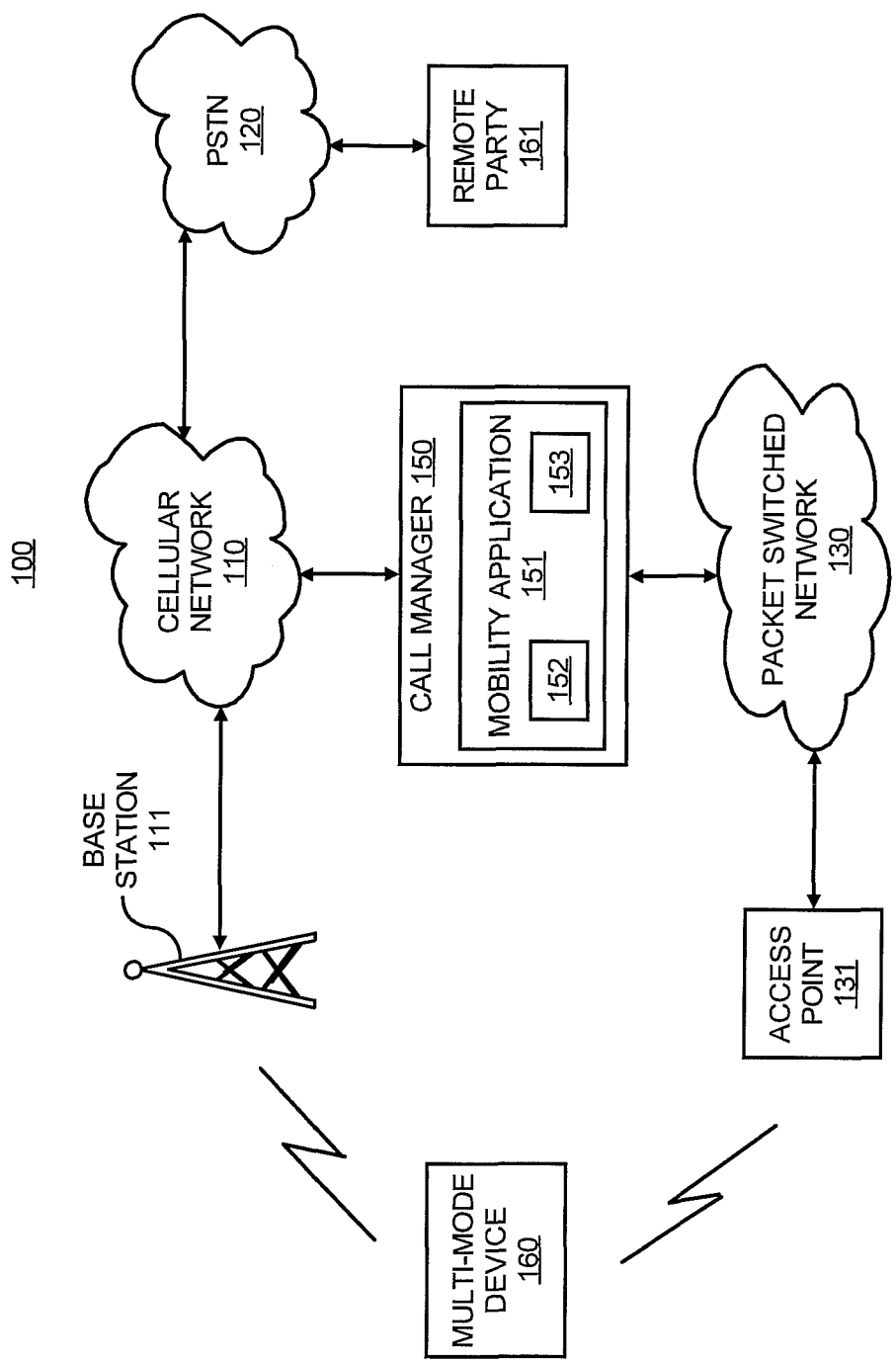
FIG. 1 illustrates a system for providing in-call handoff, according to an embodiment.

FIG. 1 illustrates a system 100 operable to perform in-call handoff, according to an embodiment. The system 100 includes a cellular network 110, a public switched telephone network (PSTN) 120 and a packet switched network 130. The cellular network 110 represents communications equipment, including hardware and any appropriate controlling logic and software, for providing wireless telephony services using cellular protocols and technology. Various cellular protocols and technologies may be used by the cellular network 110, including but not limited to global system for mobile communications (GSM), time division multiple access (TDMA), code division multiple access (CDMA), and any other appropriate analog or digital cellular protocol or technology. Furthermore, the cellular network 110 may utilize signaling system 7 (SS7) protocol for signaling purposes. The cellular network 110 may include equipment, some of which is not shown, including any number of base stations, such as the base station 111, base station controllers, mobile switching centers, and other appropriate communications equipment for use in communicating with cellular devices and other networks including the PSTN 120.

The packet switched network 130 represents communications equipment, including hardware and any appropriate controlling logic and software, for interconnecting elements coupled to packet switched network 130. The packet switched network 130 may represent a local area network (LAN), WLAN, a wide area network (WAN), and/or any other appropriate form of network. Furthermore, elements within the packet switched network 130 may utilize circuit-switched and/or packet-based communication protocols to provide for telephony services. For example, elements within the packet switched network 130 may utilize Internet Protocol (IP). In addition, elements within the packet switched network 130 may utilize wireless standards, such as the 802.11 family of wireless standards, to provide for wireless communication and telephony services. The packet switched network 130 may include equipment, some of which is not shown, including any number of wireless network devices, gateways, call managers, and other appropriate communications equipment for use in communicating with mobile devices and the PSTN 120. For example, the packet switched network 130 may include an access point 131 representing communications equipment, including hardware and any appropriate controlling logic, for providing wireless access to the packet switched network 130. The access point 131 may utilize one or more of the 802.11 standards, however, any appropriate wireless standard or protocol may be used.

The system 100 also includes a call manager 150. The call manager 150 represents communications equipment, including hardware and any appropriate controlling logic and software, for providing telephony services over the packet switched network 130 and for performing in-call handoff between the cellular network 110 and the packet switched network 130. For example, the call manager 150 supports VoIP communications, using any of various protocols such as SIP, signaling connection control point (SCCP) protocol, media gateway control protocol (MGCP), H.323, and/or any other appropriate signaling protocol for supporting VoIP. Also, the call manager 150 is operable to connect with the PSTN 120 and/or the cellular network 110 to perform in-call handoff. Furthermore, the call manager 150 may act as an IP PBX, for example, for a business, and support PBX functions, such as hold, park, transfer, redirect, and/or other high level and low level call management features. Alternatively, the call manager 150 may operate in a residential gateway providing communication services for residences. Alternatively, the call manager 150 may be included in a server, router, switch, bridge, other type of gateway, etc.

The call manager 150 performs in-call handoff between the cellular network 110 and the packet switched network 130. After an existing cellular call is anchored on the call manager 150, the call manager 150 facilitates handoff of the call to the packet switched network 130 and bridges the call to a remote party 161 that was the callee in the cellular call. For example, a multi-mode device 160 calls the remote party 161 via the cellular network 110. The multi-mode device 160 may be a mobile device, such as a mobile phone. When the multi-mode device 160 comes into the coverage of the packet switched network 130, the multi-mode device 160 make one call to the call manager 150 to anchor on the call manager in packet switched network and creating a VoIP session, then requests the cellular network to transfer the on-going voice session to the call manager. The call manager 150 helps to finish the handoff procedure by bridging the call leg with the multi-mode device 160 and the call leg with the remote party 161. Thus, the handed off call includes a VoIP call leg between the multimode device 160 and the call manager 150, and a call leg between the call manager 150 and the remote party.

The call manager 150 may include a mobility application 151 comprised of software. The mobility application 151 may include a calling module 152 and a handoff module 153. The call manager 150 is capable of operating as a third party call control (3PCC) server by running the mobility application 151. The calling module 152 establishes call legs between the call server manager 150, the multi-mode device 160 and the remote party 161. Once the call legs are established, the handoff module 153 hands off the call from the cellular network 110 to the packet switched network 130. In accordance with an embodiment, the call legs are initiated using a procedure defined by the Session Initiation Protocol (SIP) standard. Further details regarding the initiation can be obtained from Request for Comments (RFC) 3725, titled 'Best Current Practices for Third Party Call Control (3 pcc) in Session Initiation Protocol (SIP)', published by the Internet Engineering Task Force, in April 2004.

The multi-mode device 160 may be a mobile device including interfaces for communicating over the cellular network 110 and the packet switched network 130. The multi-mode device 160 is operable to detect when it is in range of the packet switched network 130. Then, the multi-mode device 160 may make and receive VoIP calls over the packet switched network 130. Also, the multi-mode device 160 may then request hand-off of an existing cellular call to the call manager 150.

Figure 2:
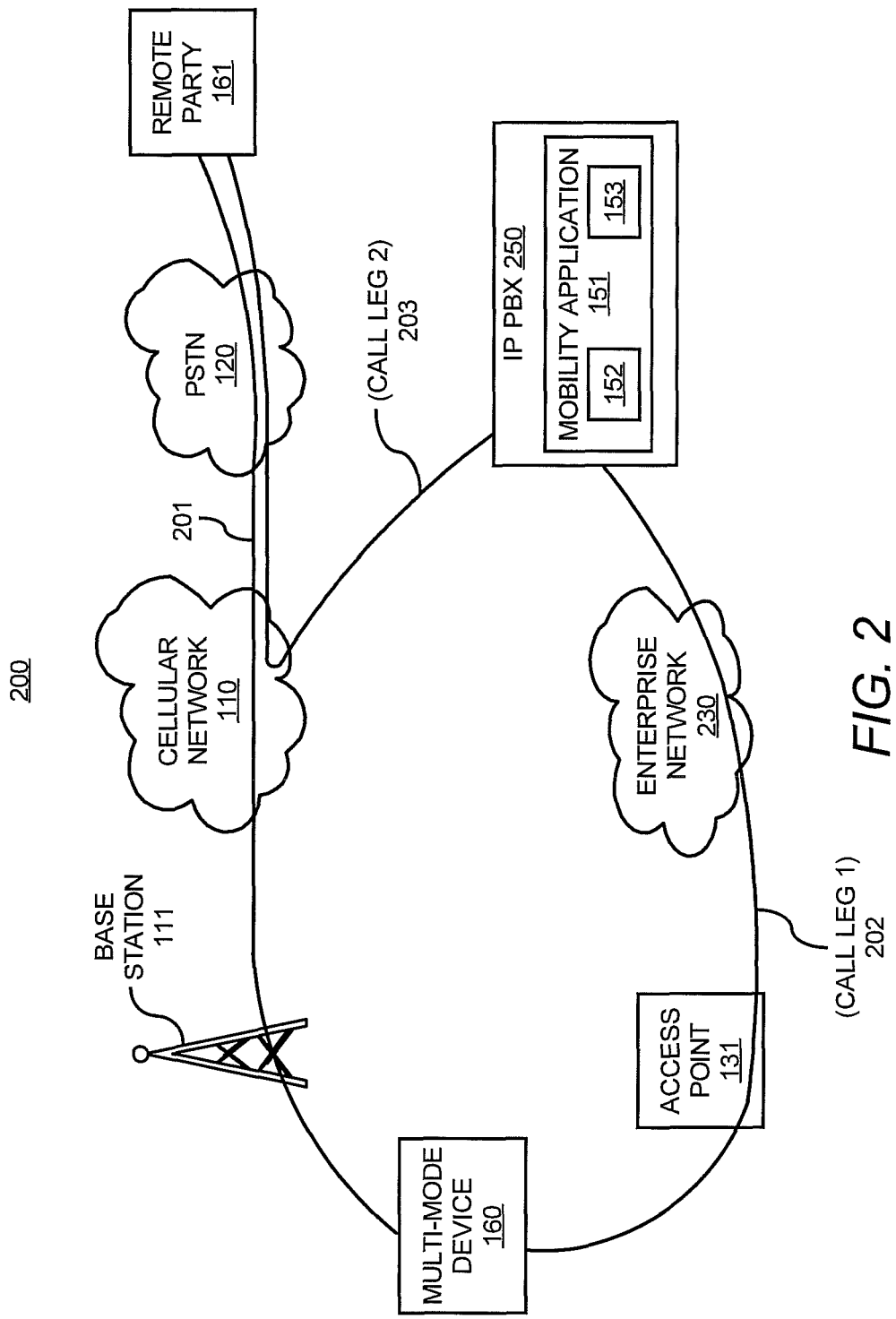
FIGS. 2 and 3 illustrate different environments for the system shown in FIG. 1, according to embodiments.
Figure 3:
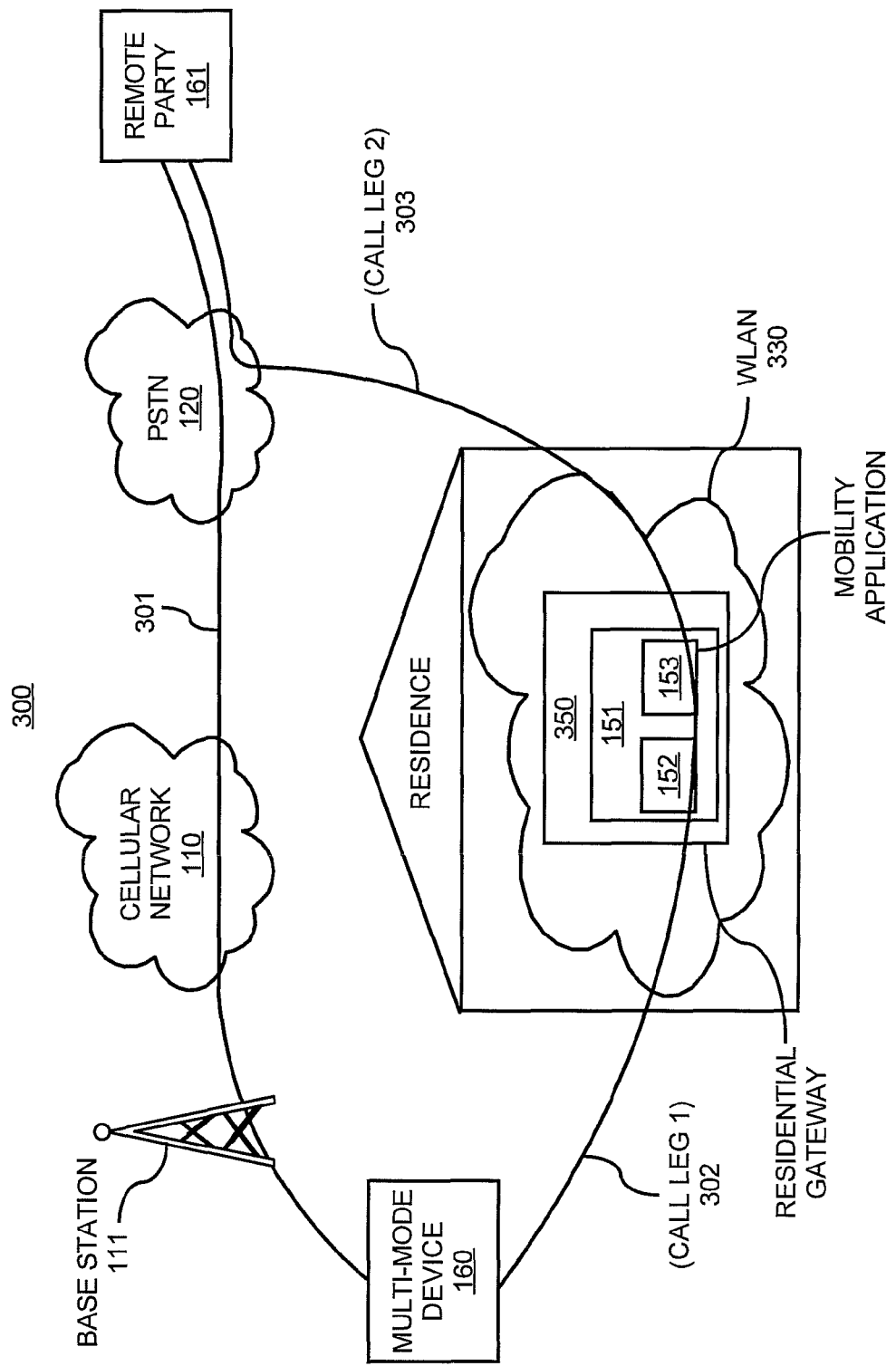

FIGS. 2 and 3 illustrate specific implementations of the system 100. FIG. 2 illustrates the system 100 in an enterprise environment 200, which may be for a business. The packet switched network 130 is comprised of the enterprise network 230, which may be a WLAN capable of accommodating VoIP sessions. The call manager 150 is incorporated in an IP PBX 250 providing conventional PBX functions for the enterprise and in-call handoff according to the embodiments described herein.

In-call handoff is performed in the enterprise environment 200 as follows. The multi-mode device 160 and the remote party 161 engage in a cellular call via the cellular network 110 and the PSTN 120, which is shown as 201. The multi-mode device 160 sets up a connection with the IP PBX 250, for example, via the access point 131. This connection is shown as 202 (call leg 1). The connection includes a VoIP session setup between the multi-mode device 160 and the IP PBX 250 when the multi-mode device 160 comes into range of the enterprise network 230. In one embodiment, the multi-mode device 160 calls a public service identity (PSI) of the IP PBX 250 to set up the connection 202 in the packet switched network and requests the transfer of the existing cellular call to the enterprise network 230 in the cellular network The IP PBX 250 then establishes call leg 2, shown as 203. The mobility application 151 bridges call legs 1 and 2, and the multi-mode handset 160 and the remote party 161 continue the call via the new bearer path comprised of call legs 1 and 2. If bearer path optimization is used, the new bearer path may bypass the cellular network 110. In this case, the IP PBX 250 establishes call leg 2 via the PSTN 120 without including the cellular network 110 in call leg 2.

FIG. 3 illustrates in-call handoff performed in a packet switched network in a residential environment 300. The packet switched network 130 is shown as WLAN 330 in the home. The call manager 150 is incorporated in a residential gateway 350, which may include a WLAN access point, broadband access via a modem, a media terminal adapter (MTA) for providing VoIP services, and other known components of a residential gateway.

The in-call handoff in the residential environment 300 is similar to the in-call handoff described with respect to FIG. 2. The multi-mode device 160 and the remote party 161 engage in a cellular call via the cellular network 110 and the PSTN 120, which is shown as 301. The multi-mode device 160 sets up a connection with the residential gateway 350, for example, via the access point 131. This connection is shown as 302 (call leg 1). The connection includes a VoIP session setup between the multi-mode device 160 and the residential gateway 350 when the multi-mode device 160 comes into range of the WLAN 330. In one embodiment, the multi-mode device 160 calls the PSI of the residential gateway 350 to set up the connection 302 and requests the transfer of the existing cellular call to the WLAN 330 in the cellular network. The residential gateway 350 then establishes call leg 2, shown as 303. The mobility application 151 bridges call legs 1 and 2, and the multi-mode handset 160 and the remote party 161 continue the call via the new bearer path comprised of call legs 1 and 2. FIG. 3 shows an optimized new bearer path that does not go through the cellular network 110. The new bearer path may not be optimized and then may include a path through the cellular network 110 in call leg 2.

Figure 4:
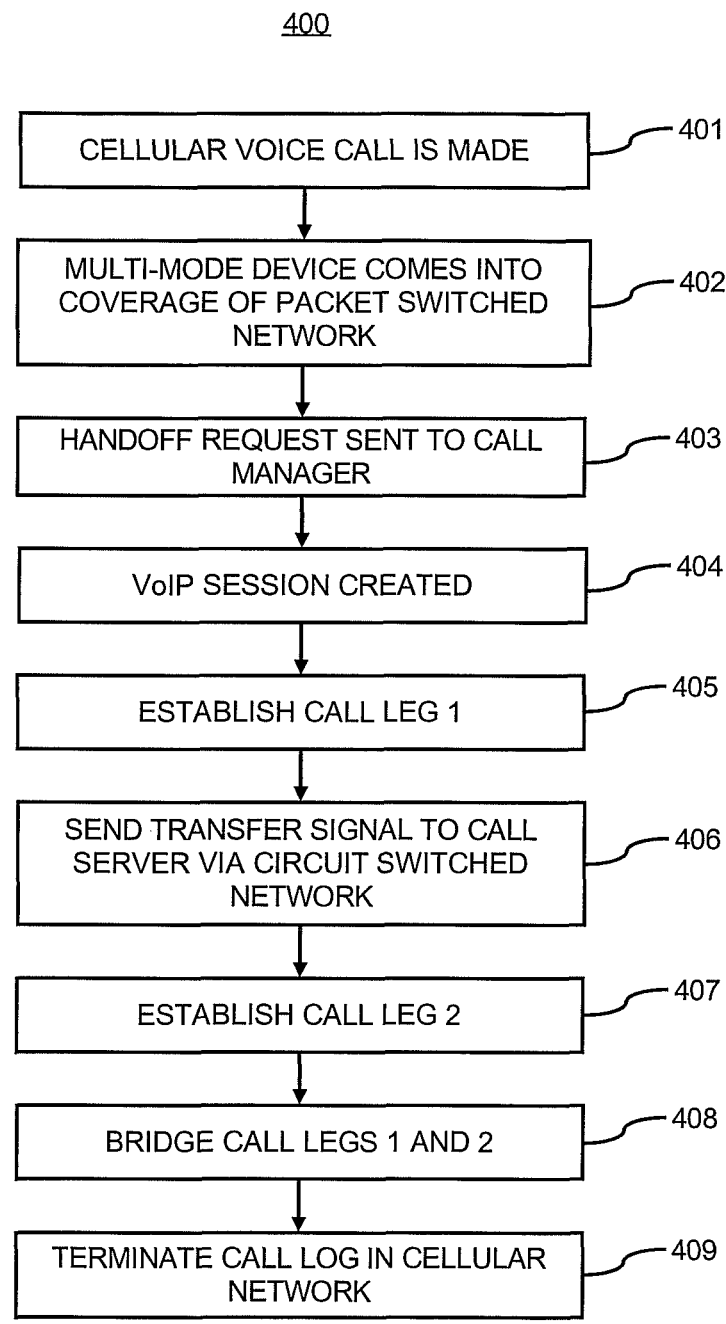
FIG. 4 illustrates a method for providing in-call handoff, according to an embodiment.

FIG. 4 illustrates a method 400 for performing in-call handoff, according to an embodiment. The method 400 is described with respect to one or more of FIGS. 1-3 by way of example and not limitation, and the method 400 may be practiced in other systems.

At step 401, a voice call is set up in the cellular network 110 shown in FIG. 1, which is a circuit switched network. For example, a cellular call is established in the cellular network 110 between the multi-mode device 160 and the remote party 161. The bearer path for the voice call may include a call leg in the cellular network 110 and a call leg in the PSTN 120.

At step 402, the multi-mode device 160 comes into the coverage of the packet switched network 130 shown in FIG. 1. For example, the multi-mode device 160 may be a mobile handset that originates the call in the cellular network 110 and desires to switch the call to a VoIP call, for example, to minimize cellular phone airtime costs, when the multi-mode device 160 comes into the coverage of the packet switched network 130. The packet switched network 130 may include a WLAN.

At step 403, the multi-mode device 160 sends a handoff request to the call manager 150 to handoff the call from the circuit switched network (e.g., cellular network 110) to the packet switched network 130. For example, the multi-mode device 160 detects when the device 160 is in the coverage of the packet switched network 130. The multi-mode device 160 sends a request to handoff the current cellular call to the packet switched network 130 using the PSI (public service identity) of the call manager 150. The packet switched network 130, for example, includes an IP multimedia system (IMS) architecture. The call manager 150 operates as an application server in the IMS. SIP is used for signaling and interfacing with other devices including the multi-mode device 160. The PSI is a unique identifier of the call manager 150 or the mobility application 151 executed by the call manager 150. The multi-mode device 160 and the call manager 150 may run SIP agents, and the multi-mode device 160 routes a handoff request using the PSI of the call manager 150 and the SIP agent. The PSI of the call manager 150 may be predetermined by the multi-mode device 160 or transmitted to any device entering the packet switched network 130. The PSI is used to route the handoff request in the packet switched network 130 to the call manager 150. Routing the handoff request may include dialing the PSI of the call manager 150 when the multi-mode device 160 is in the coverage of the packet switched network 130 if the PSI is in the form of a telephone number. However, the PSI of the call manager 150 may be a uniform resource identifier that is included in SIP signaling messages to route messages between the multi-mode device 160 to the call manager 150. The multi-mode device 160 anchors the cellular call on the call manager 150 by sending the handoff request to the call manager 150, for example, using the PSI of the call manager 150. Anchoring the call on the call manager 150 includes providing call signaling through the call manager 150.

At step 404, a VoIP session is setup between the multi-mode device 160 and the call manager 150, and at step 405 call leg 1 is established. Call leg 1 is shown in FIGS. 2 and 3. The mobility application 151 communicates with the multi-mode device 160 to setup the VoIP session in the packet switched network 130 and the VoIP session is executed on call leg 1.

At step 406, the multi-mode device 160 sends a transfer signal to hand off the call to the call manager 150. The transfer signal includes the PSI of the call manager 150 and is sent via the circuit switched network. The transfer signal is sent to a call server in the cellular network 110 or the PSTN 120. Conventional signaling may be used to send the transfer signal to the call server. For example, if the bearer path between the multi-mode device 160 and the remote party 161 is to be optimized, the transfer signal is sent to a call server in the PSTN 120. The call server in the PSTN 120 hands off the call to the call manager 150 and a final bearer path is established without the cellular network 110. If the bearer path is not to be optimized, the transfer signal is sent to a call server in the cellular network 110, and the call server in the cellular network 110 hands off the call to the call manager 150. The final bearer path is established with the cellular network 110.

At step 407, the call manager 150 establishes a call leg between the remote party 160 and the call manager 150, which is shown as call leg 2 in FIGS. 2 and 3. This call leg may include the PSTN 120, which is a circuit switched network. The call manager 150 may include a circuit switched network interface for establishing a call leg in the PSTN 120.

At step 408, the call manager 150 bridges call legs 1 and 2 to establish a new bearer path between the multi-mode device 160 and the remote party 161, which includes a call leg in the packet switched network 130. This bearer may be optimized.

At step 409, the call leg in the cellular network 110 is terminated by the cellular network (e.g., a call server in the cellular network) after the voice session is transferred from the multi-mode circuit switched interface of the multi-mode device 160 to the call manager 150 using the PSI of the call manager 150.

The method 400 described in-call handoff from the cellular network 110 to the packet switched network 130. In-call handoff from the packet switched network 130 to the cellular network 110 may also be performed. For example, the multi-mode device 160 sends a request in the packet switched network 130 to the call manager 150 using the PSI of the call manager 150 to transfer the call from the call manager 150 to the multi-mode device 160. The call manager 150 forwards the request to a call server in the PSTN 120 or the cellular network 110. The call server transfers the call from the PSI of the call manager 150 to the multi-mode device 160 so the call is no longer anchored in the call manager 150. The new bearer path includes call legs in the cellular network 110 and/or the PSTN 120.

Figure 5:
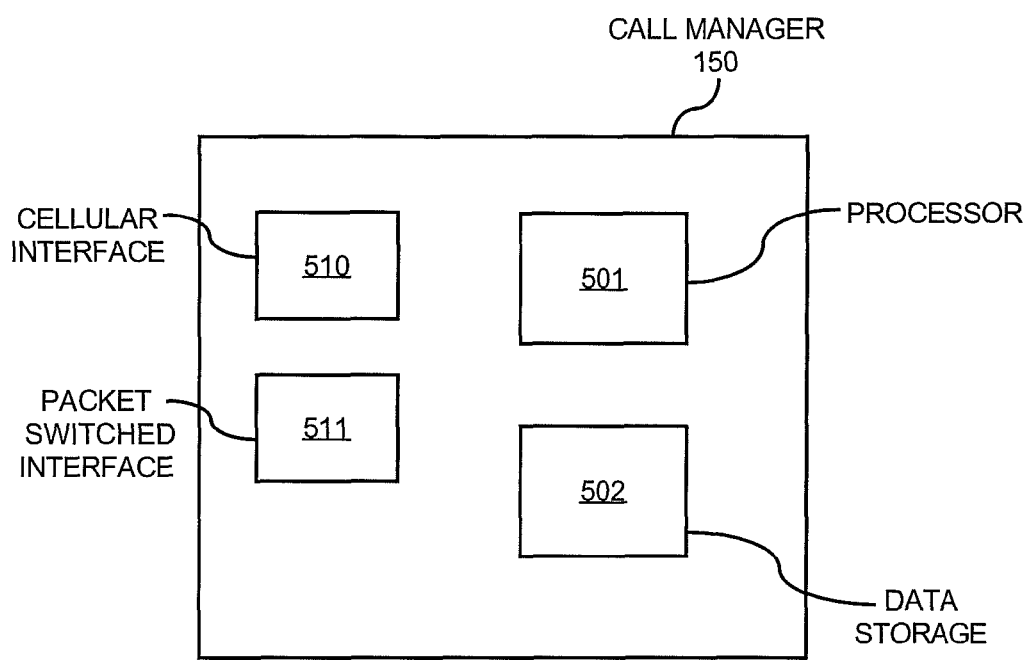
FIG. 5 illustrates a block diagram of a call manager, according to an embodiment.

FIG. 5 illustrates a block diagram of the call manager 150, according to an embodiment. The call manager 150 is a telecommunications device that may include a processor 501 and data storage 502. The data storage 502 may include memory and may include other types of storage. The mobility application 151 may include software that resides in the data storage 502 and is executed by the processor 501. One or more of the steps of the method 400 may be provided as software executed by the processor 501. The call manager 150 also includes a cellular interface 510 and a packet switched interface 511 for communicating with the cellular network 110 and the packet switched network 130 respectively. The call manager 150 may include many other components. For example, the call manager 150 may be incorporated in a residential gateway or an IP PBX and the telecommunications device shown in FIG. 5 would include conventional components for a residential gateway or an IP PBX.

Figure 6:
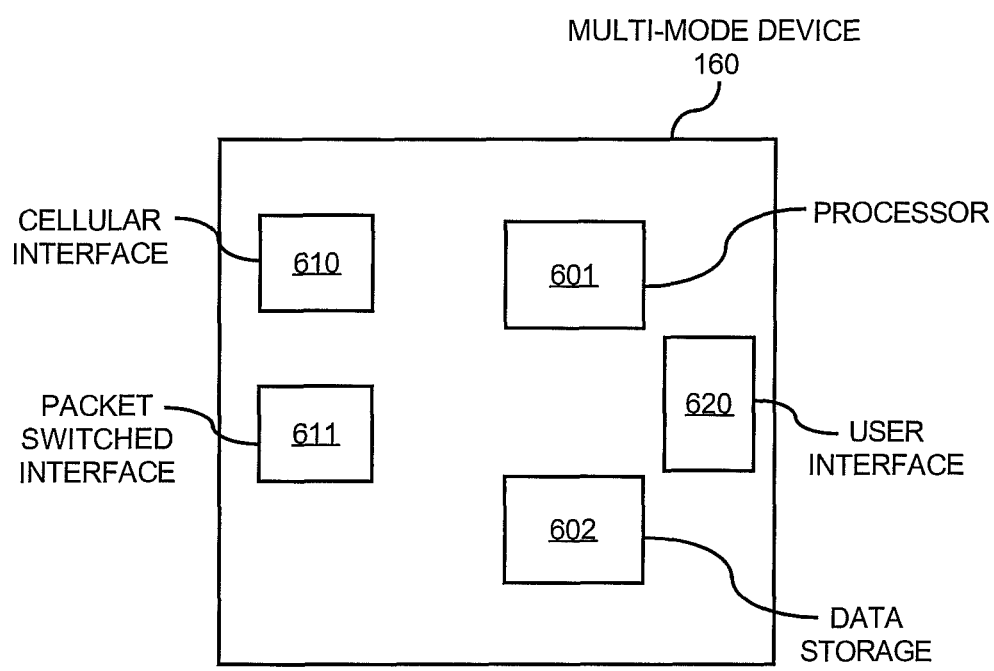
FIG. 6 illustrates a block diagram of a multi-mode device, according to an embodiment.

FIG. 6 illustrates a block diagram of the multi-mode device 160, according to an embodiment. The multi-mode device 160 is a communications device that may include a processor 601 and data storage 602. The data storage 602 may include memory and may include other types of storage. The data storage 602 may store software that is executed by the processor 601. The processor may perform one or more of the steps of the method 400. For example, the software may make and receive calls. Also, the software may generate and send a handoff request to the call manager 150 when the multi-mode device 160 is in the coverage of the packet switched network 130. The multi-mode device 160 also includes a cellular interface 610 and a packet switched interface 611 for communicating with the cellular network 110 and the packet switched network 130 respectively. The packet switched interface 611 may also be operable to detect when multi-mode device 160 is in WLAN coverage. Thus, the packet switched interface 611 may operate as a WLAN detector or a separate element may be provided, for example, that detects the signal strength of a WLAN or other packet switched network. The multi-mode device 160 also includes a user interface 620, such as a keypad, display, speaker, etc. In one embodiment, the multi-mode device is a mobile handset similar to a cellular phone but with WLAN and cellular interfaces.

One or more of the steps in the method 400 and other steps described herein are operable to be embodied by a computer program, which can exist in a variety of forms both active and inactive. For example, they exist as software program(s) comprised of program instructions in source code, object code, executable code or other formats for performing some of the steps. The codes described above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A telecommunications device operable to perform in-call handoff between cellular and packet-switched networks, the telecommunications device comprising:
   a circuit-switched interface connecting the telecommunications device with a circuit-switched network;
   a packet-switched network interface connecting the telecommunications device with a packet-switched network; and
   a processor receiving a request from a multi-mode device to transfer an existing call that was made by the multi-mode device over a cellular network to a remote party using a cellular interface of the multi-mode device to a call that is between the multimode device and the remote party over the packet switched network using a packet interface of the multi-mode device, wherein the existing call was established in the cellular network without using the telecommunications device, and wherein the request is sent using a public service identity of the telecommunications device;
   in response to receiving the request, the processor establishes a first call leg in the packet-switched network between the telecommunications device and the multi-mode device via the packet-switched interface, establishes a second call leg between the telecommunications device and the remote party via the circuit-switched interface; and transfers the call from the cellular network to the telecommunications device such that the call between the multi-mode device and the remote party uses the first and second call legs.

2. The telecommunications device of claim 1, wherein a bearer path of the call using the first and second call legs includes the packet-switched network and a public switched telephone network (PSTN).

3. The telecommunications device of claim 1, wherein the multi-mode device is operable to make cellular voice calls and voice over Internet Protocol (VoIP) calls.

4. The telecommunications device of claim 3, wherein the multi-mode device is a mobile multi-mode device, and the processor receives the request from the mobile multi-mode device when the mobile multi-mode device is in the coverage of the packet-switched network.

5. The telecommunications device of claim 4, wherein a VoIP session is created between the multi-mode device and the telecommunications device in the first call leg.

6. The telecommunications device of claim 5, wherein the second call leg comprises a connection in a PSTN between the telecommunications device and the remote party.

7. The telecommunications device of claim 6, wherein the second connection comprises an optimized bearer path in the PSTN between the telecommunications device and the remote party, wherein the optimized bearer path does not go through the cellular network.

8. The telecommunications device of claim 1, wherein the telecommunications device comprises an IP PBX.

9. The telecommunications device of claim 1, wherein the telecommunications device comprises a residential gateway.

10. A mobile multi-mode device operable to perform in-call handoff from cellular to VoIP in a wireless local area network (WLAN) using a telecommunications device, the mobile multimode device comprising:
 a WLAN detector operable to detect a WLAN;
 a WLAN interface operable to connect the mobile multi-mode device to the WLAN;
 a cellular network interface engaged in an active cellular call with a remote party, wherein the cellular call was established without using the WLAN interface and the telecommunications device; and
 a processor sending a handoff request to the telecommunications device via the WLAN interface for handing off the active cellular call to a VoIP call when the detector detects the WLAN, wherein the handoff request includes the public service identity of the telecommunications device, and the processor creating a VoIP session between the multi-mode device and the telecommunications device, wherein the VoIP session is used in a call leg between the multi-mode device and the telecommunications device when the call is handed off from the cellular network to the packet switched network.

11. The mobile multi-mode device of claim 10, wherein a call leg in the cellular network is terminated after the handoff.

12. The mobile multi-mode device of claim 10, wherein the mobile multimode device uses the public service identity of the telecommunications device to route the handoff request via the WLAN interface to the telecommunications device.

13. The mobile multi-mode device of claim 10, wherein a new bearer path for the call includes the call leg in the packet switched network and a second call leg between the telecommunications device and the remote party through a PSTN.

14. A method of performing in-call handoff from a cellular network to a packet switched network, the method comprising:
 receiving a handoff request from a multi-mode device at a telecommunications device, wherein the multi-mode device is currently engaged in a call over a cellular network with a remote party and the cellular call was established without using the telecommunications device and wherein the handoff request includes a public service identity of the telecommunications device;
 setting up a VoIP session with the multi-mode device over a first call leg in a packet switched network;
 establishing a second leg with the remote party;
 transferring the call from the cellular network to the packet-switched network, wherein a new bearer path for the call includes the first call leg and the second call leg.

15. The method of claim 14, wherein receiving a handoff request from a multi-mode device comprises:
 using the public service identity of the telecommunications device to route the handoff request in the packet switched network to the telecommunications device.

16. The method of claim 14, wherein the multi-mode device sends the handoff request to the telecommunications device when the multi-mode device detects that the multi-mode device is in the coverage of the packet switched network.

17. The method of claim 14, wherein the call is anchored on the telecommunications device in response to receiving the handoff request.

18. The method of claim 14, further comprising:
 bridging the first call and the second call leg to create the new bearer path for the call.

19. The method of claim 18, further comprising:
 optimizing the new bearer path such that the new bearer path does not go through the cellular network, wherein the optimized bearer path does not go through the cellular network.

20. The method of claim 14, further comprising:
 terminating a call leg in the cellular network after handing off the call to the packet switched network.

* * * * *